United States Patent Office 2,728,350
Patented Dec. 27, 1955

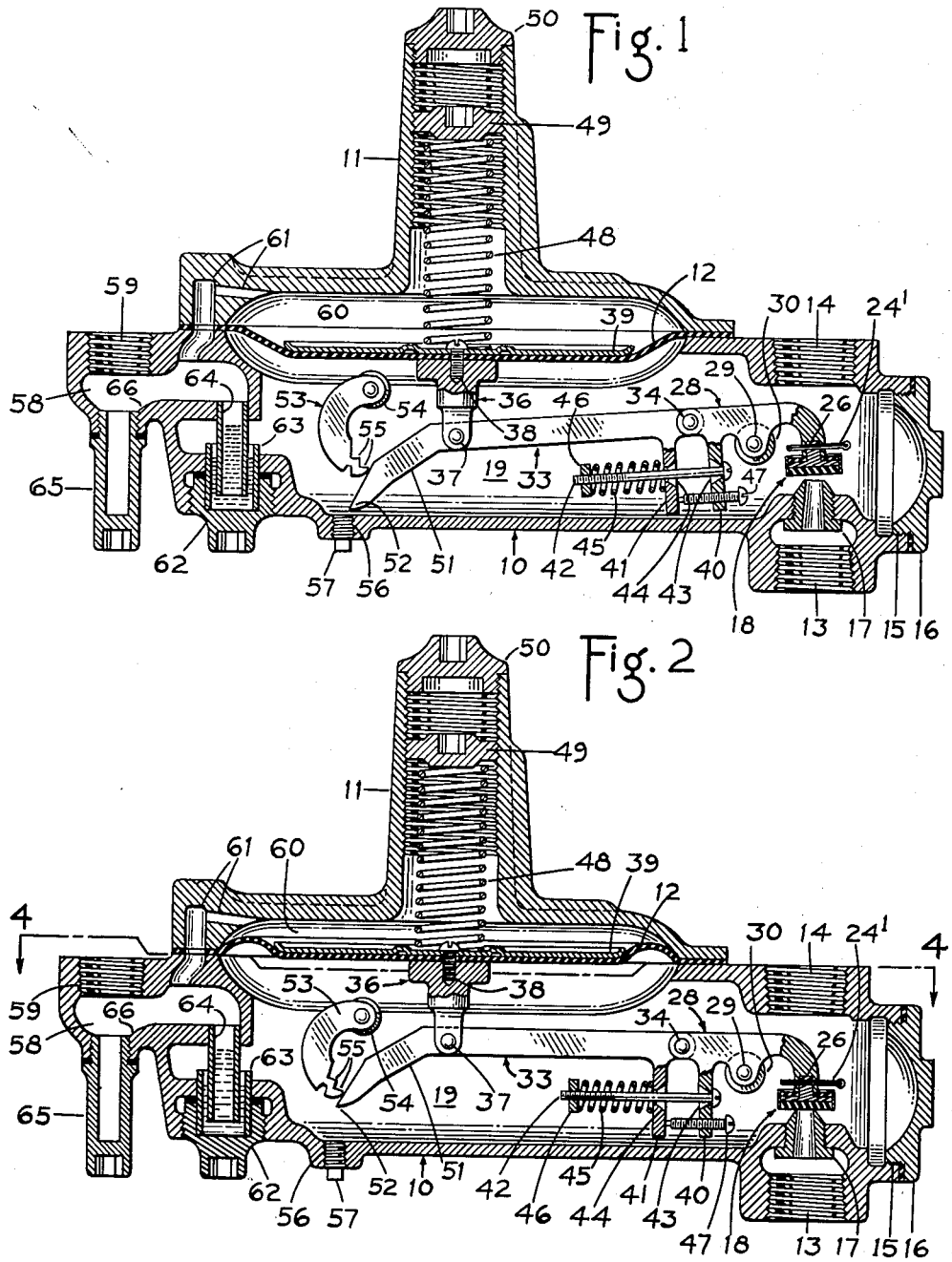
Dec. 27, 1955 — F. G. HUTCHENS — 2,728,350
FLUID PRESSURE REGULATOR
Filed June 9, 1954 — 3 Sheets-Sheet 1
FRANCIS G. HUTCHENS
INVENTOR.
ATTORNEY Dec. 27, 1955     F. G. HUTCHENS     2,728,350
FLUID PRESSURE REGULATOR
Filed June 9, 1954     3 Sheets—Sheet 2
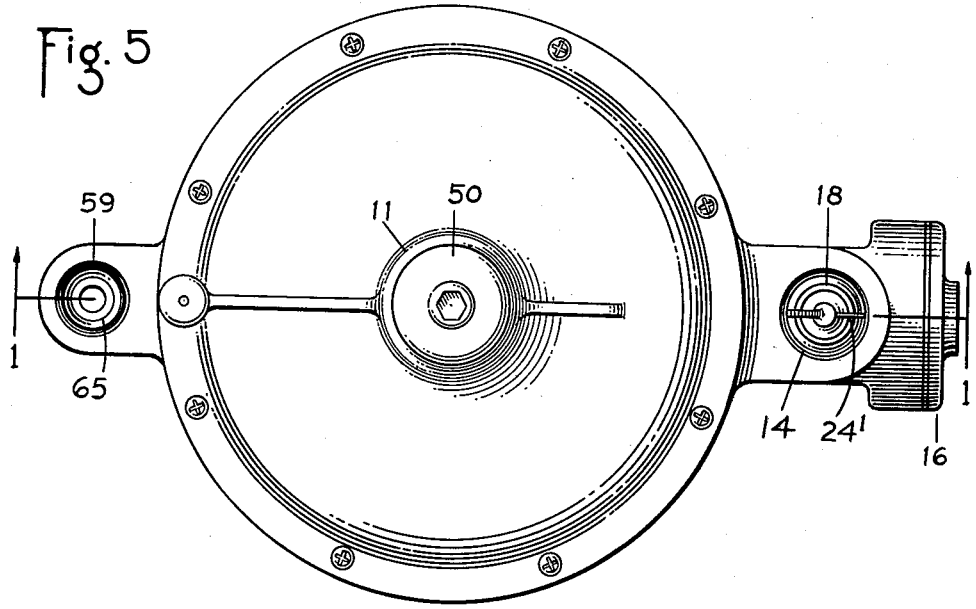
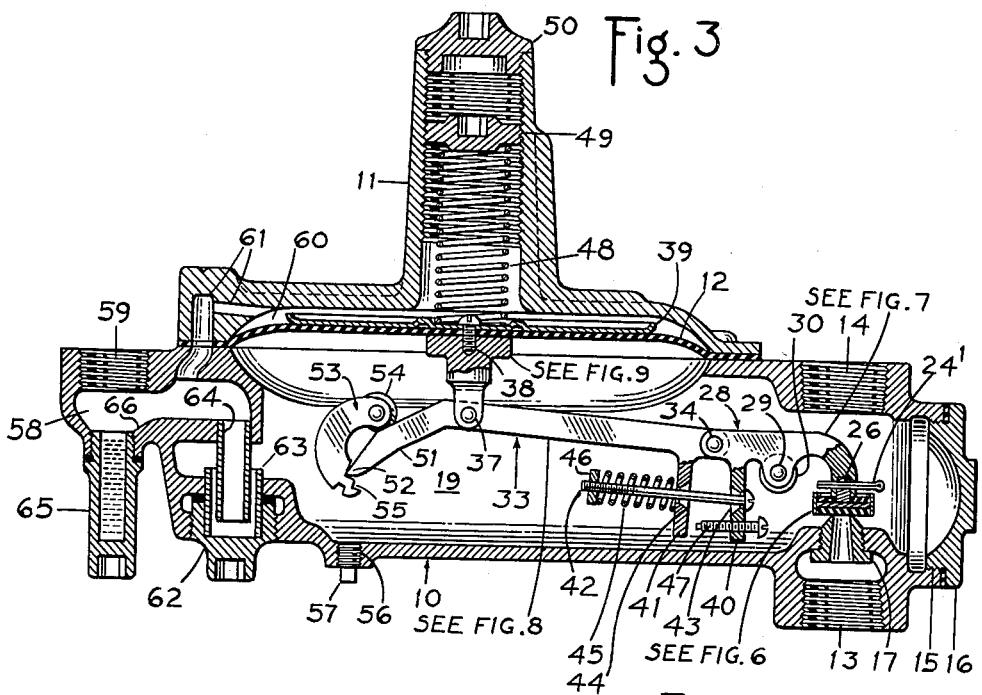
Francis G. Hutchens
INVENTOR.
BY *G. Lorenz Miller*
ATTORNEY Dec. 27, 1955  F. G. HUTCHENS  2,728,350
FLUID PRESSURE REGULATOR
Filed June 9, 1954  3 Sheets-Sheet 3
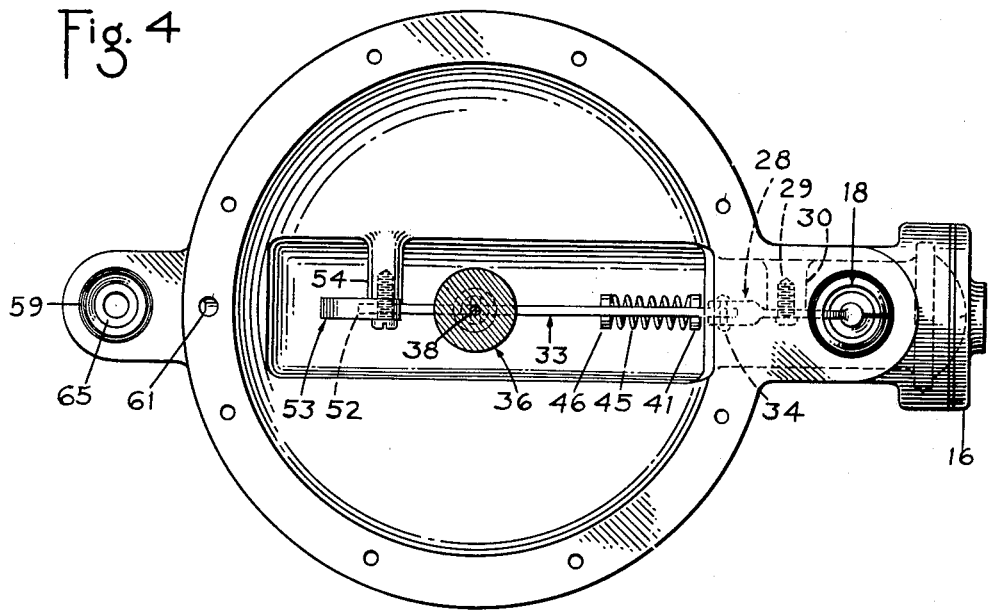
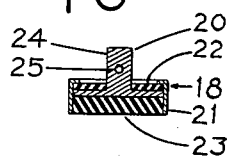
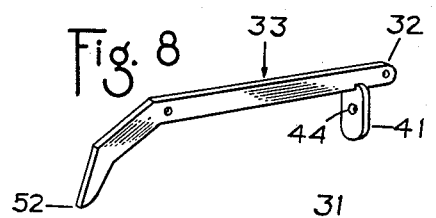
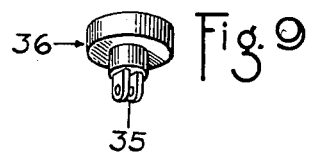
FRANCIS G. HUTCHENS
INVENTOR.
BY
ATTORNEY

2,728,350

FLUID PRESSURE REGULATOR

Francis G. Hutchens, Anderson, Ind.

Application June 9, 1954, Serial No. 435,439

9 Claims. (Cl. 137—461)

This invention relates to a fluid pressure regulator.

The invention is more particularly concerned with a fluid pressure regulator which is characterized by improved safety means in the event of improper seating of a fluid flow control valve on a valve seat, whereby dangerous high pressures in serviced utilities are avoided.

The present invention is an improvement on that disclosed in my co-pending application Serial No. 435,438, filed June 9, 1954.

A primary object of the invention is to provide a fluid pressure regulator which is operative in maintaining a substantially uniform outlet pressure under normal operating conditions and which under abnormal operating conditions avoids dangerously high outlet pressure.

A further object of the invention is to provide a safety fluid pressure regulator which is relatively simple in construction and dependable in operation.

Other objects and advantages of the invention will become apparent in the course of the following detailed description taken in connection with the accompanying drawings, wherein—

Fig. 1 is a vertical sectional view of the improved regulator as observed in the plane of line 1—1 on Fig. 5.

Fig. 2 is a view corresponding to Fig. 1 showing the valve of the regulator in closed position.

Fig. 3 is a further view corresponding to Fig. 1 but showing the regulator in locked position.

Fig. 4 is a top plan view of the diaphragm housing as observed in the plane of line 4—4 on Fig. 2.

Fig. 5 is a top plan view of the entire regulator.

Fig. 6 is a diametrical sectional view of the valve structure.

Fig. 7 is a perspective view of a valve supporting secondary lever.

Fig. 8 is a perspective view of a primary valve actuating lever.

Fig. 9 is a perspective view of a connecting member interposed between the primary lever and a diaphragm plate.

Referring now in detail to the drawings, 10 designates a diaphragm or fluid flow housing which is surmounted by a spring enclosing housing 11.

Interposed between the housings 10 and 11 is a flexible diaphragm 12 whose margin is clamped between the said housings.

The housing 10 at one end thereof is provided with vertically spaced and axially aligned fluid inlet and outlet openings 13 and 14 respectively. The housing 10 at said end and intermediate the openings 13 and 14 is provided with an inspection and adjustment opening 15 which is normally closed by a screw plug 16.

A ported valve seat member 17 is threadedly engaged with housing 10 above said inlet opening 13 and co-axial therewith and a valve structure 18 co-operates with said seat member in the control of fluid flow through the inlet opening 13 and into the chamber 19 provided by the housing 10 in co-operation with the diaphragm 12.

While the valve structure 18 is more fully described in my referred to co-pending application, it generally comprises (Fig. 6) a metallic base 20, a cup 21, a resilient mounting member 22 and a valve seat contacting disc 23.

The base 20 includes a stem 24 having a diametrical aperture 25 and the stem is received within a recess 26 in the downwardly turned end 27 of a secondary lever 28 (Fig. 7) which has pivotal connection on a pin 29 intermediate its ends and which pin is threadedly engaged within a boss 30 projecting laterally inwardly from the wall of housing 10. The stem 24 is secured in recess 26 by a cotter pin 24$^1$.

The opposite end of the secondary lever 28 is bifurcated as at 31 and within which is received an end 32 of a primary operating lever 33 and a pivot pin 34 extends through the interengaging ends of the levers 28 and 33 for relative angular movement of the levers.

The lever 33 adjacent its opposite and free end is disposed within a bifurcation 35 (Fig. 9) of an element 36 and a pivot pin 37 extends through the bifurcation and the lever for relative pivotal movement.

The element 36 in common with the basic structure disclosed in my said co-pending application is engaged with the diaphragm 12 and a screw 38 extends through a diaphragm plate 39 and into said element with the diaphragm clamped therebetween.

The levers 28 and 33 are provided with normally parallel depending flanges 40 and 41 adjacent to and on opposite sides of the pivot pin 34.

A screw 42 extends loosely through horizontally aligned apertures 43, 44 in the flanges 40, 41 with the head thereof engaged with flange 40 and the screw projecting a substantial distance inwardly from the flange 41. A coil spring 45 surrounds the projecting end of the screw and has its opposite ends bearing on flange 41 and a nut 46 adjustable on the threaded end of the screw.

The spring 45 is under adjustable compression and urges the flanges 40, 41 toward each other and which movement is limited by a stop screw 47 adjustably threaded in flange 40 with its free end normally in engagement with flange 41.

As in said co-pending application, a spring 48 is disposed within said housing 11 in vertical position with its lower end bearing on the diaphragm plate 39 and with its upper end engaged with an externally threaded plug 49 which is vertically adjustable by engagement thereof with an internal thread on the housing 11. Thus upon rotation of the plug, the compression of spring 48 may be varied as circumstances may warrant.

A closure cap 50 is threaded into the upper end of the housing 11 for concealment of the adjusting plug 49.

The free end portion of lever 33 is inclined downwardly and away from pivot pin 37 as indicated at 51 and terminates in a point 52.

A light weight pawl 53 has one end thereof pivotally connected to a boss 54 projecting laterally inwardly of the wall of housing 10. The pawl is of arcuate form with its concave side opposite the end portion 51 of lever 33 and the pawl is freely suspended from its pivotal connection.

The lower free end of the pawl is provided with teeth 55 either of which is engageable by the point 52 of lever 33 under circumstances later referred to.

The bottom wall of housing 10 is provided with a threaded aperture 56 for a purpose later referred to and in which is normally positioned a plug 57.

The end of housing 10 opposed to the fluid inlet and outlet end thereof is provided with a mercury seal, as in the basic structure of my referred to co-pending application, and same generally comprises a mercury well 58 with which communicates a vent pipe connection opening 59. The well 58 is also in communication with the chamber 60 in the housing 11 through a passage 61.

A mercury cup 62 is threaded into the housing 10 and in which is seated a mercury well tube 63 whose upper end is in communication with the chamber 19 in housing 10. A mercury seal tube 64 of less diameter than tube 63 has its lower end disposed within tube 63 in spaced relation to the bottom thereof and the upper end of tube 64 is in communication with the mercury well 58.

A mercury salvage cup 65 is removably supported in the housing 10 with its upper open end in communication with the mercury well 58, the bottom wall of which slopes downwardly as at 66 to the mouth of the salvage cup.

Having set forth the preferred structure of my invention, the operation thereof is as follows:

The regulator is shown in wide open position in Fig. 1 with the diaphragm 12 downwardly flexed under action of the spring 48 which has been set to a predetermined pressure.

In Fig. 2 the regulator is shown in lock-off or no flow position and wherein the point 52 of lever 33 is disposed adjacent the toothed end of the pawl 53.

In the lever positions of Figs. 1 and 2 the flanges 40, 41 have maintained their normal positions and no relative pivotal action between the levers 28, 33 has taken place.

In Fig. 3 is shown the safety feature of the invention wherein the valve is seated but due to possible improper seating, fluid continues to pass the valve and valve seat with a resulting build up of pressure within the chamber 19.

Such build up of pressure results in upward movement of the diaphragm together with lever 33 relative to lever 28 against the yieldable resistance of spring 45 until the point 52 of lever 33 engages a tooth 55 on pawl 53 thereby locking the lever 33 in its attained position and restraining the chamber 19 to a constant volume whereby upon further increase of pressure within the chamber the mercury seal will be broken and the mercury normally disposed within tubes 63 and 64 will be transferred under pressure to the salvage cup 65 whereby the fluid is by-passed through tubes 63, 64 and the mercury well 58 to the vent opening 59. At this time passage 61 will cause equalization of fluid pressure on opposite sides of the diaphragm. With this improved safety construction, consumers will not be subjected to abnormally high and dangerous pressures in their operating utilities.

Furthermore, the safety means will be substantially economical in that the escape of gas will be limited to the maximum passing capacity of the blown mercury seal and which obviously will be for a limited period of time since under such conditions, a service man will be soon called to set the regulator into normal operating condition.

The stop screw 47 may be accessible for adjustment through opening 15 and upon resetting of the regulator, access is had to the pawl 53 through opening 56.

After correcting the fault which caused the mercury seal to blow, the service man will remove the mercury cup 62 and pour the salvaged mercury thereinto.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. In a fluid pressure regulator, an elongated housing having inlet and outlet fluid openings adjacent one end thereof, a second housing supported on said first housing and communicating therewith, a flexible diaphragm having its margin clamped between said housings and providing with the walls of said first housing a fluid chamber, an adjustable coil spring in said second housing having one end thereof bearing on said diaphragm, a ported valve seat supported by said first housing in communication with said inlet opening and said chamber, a resilient valve co-operating with said seat, a lever means supporting said valve on one end thereof, said lever means adjacent the opposite end thereof being pivotally connected to said diaphragm, a yieldable joint in said lever means intermediate the ends thereof, said lever means being pivotally connected to said first housing intermediate said valve and said yieldable joint, whereby outward flexing of said diaphragm under fluid pressure in said chamber will seat said valve through said normally straight lever means, said yieldable joint providing for further outward flexing of said diaphragm by increased fluid pressure resulting from faulty seating of the valve, and automatic means for locking the lever means in the position assumed thereby when said diaphragm has reached the maximum of its said further outward flexing.

2. The structure according to claim 1, together with a mercury seal in the opposite end of said first housing, said seal being blown by fluid pressure within the chamber subsequent to said locking of said lever means for escape of fluid pressure from the chamber to atmosphere.

3. The structure according to claim 1, wherein said inlet and outlet openings and said ported valve seat have a common axis.

4. The structure according to claim 1, wherein said lever means comprises a relatively long primary operating lever and a relatively short secondary valve supporting lever, said levers being pivotally connected at adjacent ends thereof, said valve being carried by the other end of said secondary lever, said primary lever being connected to said diaphragm adjacent its opposite end, and said yieldable joint comprising said pivotal connection of the levers together with spring means disposed laterally of said pivotal connection and biasing said primary lever counter-clockwise relative to said secondary lever.

5. The structure according to claim 4, wherein said levers are provided with normally generally parallel flanges at opposite sides of said pivotal connection and said spring means comprising an elongated screw extending through said flanges, a spring encircling one end of said screw and having one end thereof abutting one of said flanges, and a nut on said screw abutting the opposite end of the spring.

6. The structure according to claim 5, together with a stop screw adjustably threaded through one of said flanges and the free end of said screw abutting the other flange to limit said counter-clockwise biasing of said primary lever.

7. The structure according to claim 6, wherein said first end of said first housing is provided with a normally closed opening intermediate said inlet and outlet openings providing access to said stop screw for adjusting same.

8. The structure according to claim 1, wherein said lever means comprises an elongated lever to which said diaphragm is pivotally connected and said locking means comprising an end portion on said lever which is inclined downwardly and outwardly from said pivotal connection and which terminates in a point, and a light weight pawl freely suspended from a pivotal connection of one end thereof with said first housing and a tooth on the free end of the pawl engageable with said point on said lever upon said maximum flexing of said diaphragm.

9. The structure according to claim 8, together with a pawl resetting tool access opening in said first housing which is normally closed by a plug.

References Cited in the file of this patent
UNITED STATES PATENTS

| | | |
|---|---|---|
| 1,067,633 | Zander | July 15, 1913 |
| 1,166,027 | Weisgerber | Dec. 28, 1915 |